May 11, 1954   C. ARNE   2,678,060
FLOAT GAUGE
Filed Oct. 8, 1947   2 Sheets-Sheet 1

Inventor:
Christian Arne,
Attys.

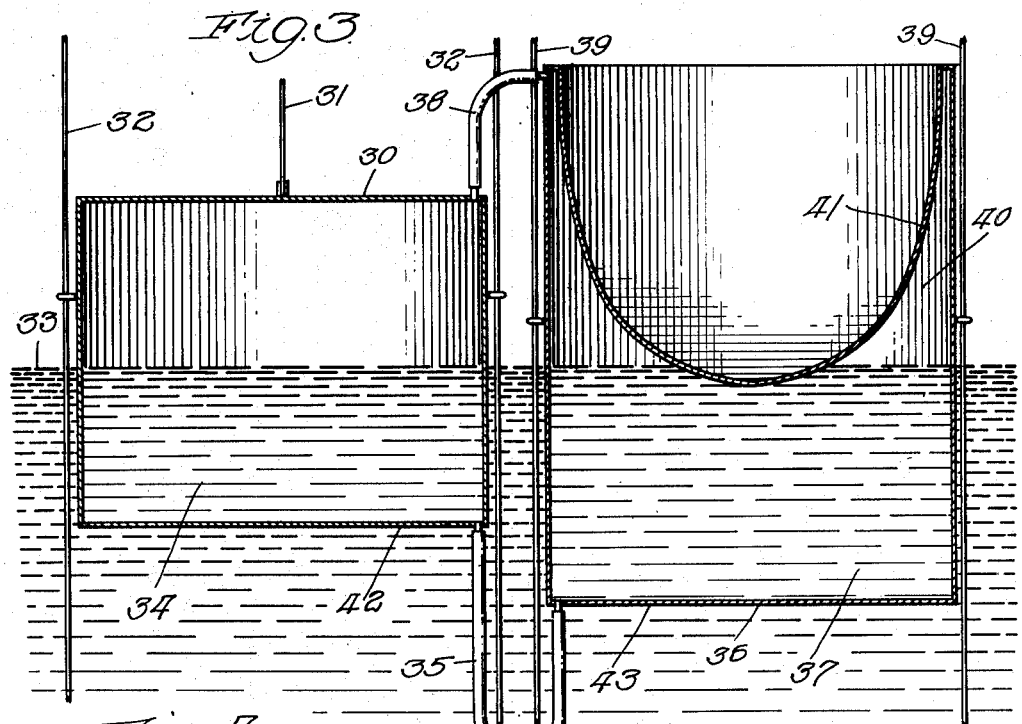
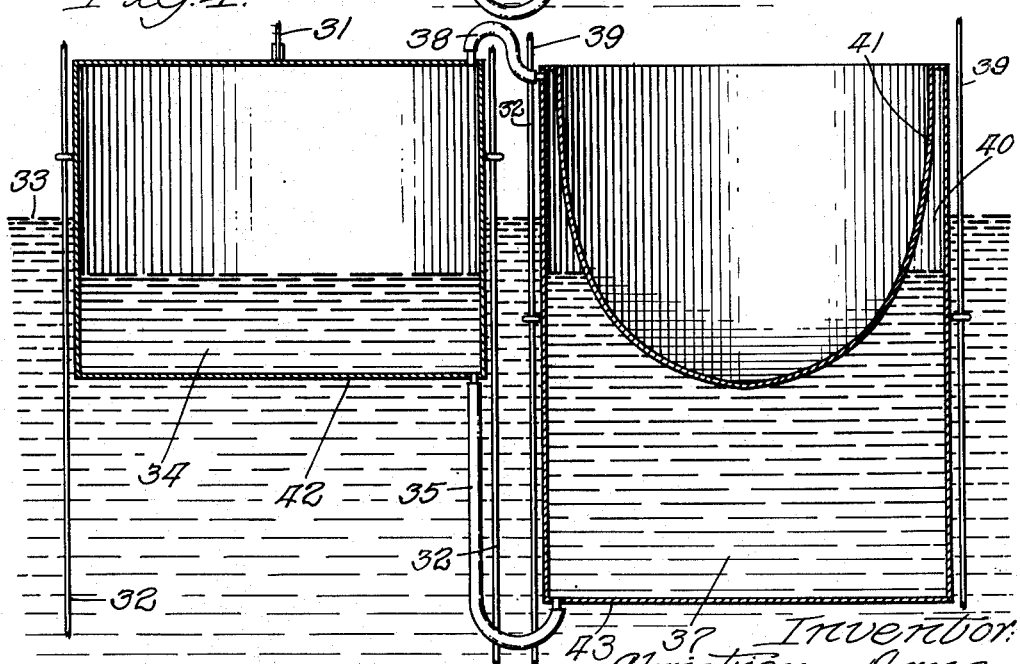

Patented May 11, 1954

2,678,060

UNITED STATES PATENT OFFICE 2,678,060

FLOAT GAUGE

Christian Arne, Chicago, Ill., assignor to Chicago Bridge & Iron Company, a corporation of Illinois Application October 8, 1947, Serial No. 778,621

12 Claims. (Cl. 137—452)

This invention relates to a float and more particularly to a float adapted to be used in conjunction with a gauge for measuring the height of a contained liquid.

The level of a contained liquid is customarily measured by means of a gauge float floating on the surface of the liquid to which is attached a calibrated tape leading to a measuring device for indicating the height of the liquid. Such gauge floats, while functioning efficiently under normal conditions, give completely inaccurate readings when the specific gravity of the contained liquid changes. For example, such floats cannot be used with any degree of accuracy in measuring the height of contained liquids in lock gates in tidal waters where the salt content of the liquid changes with the tide. Problems also arise in measuring the height of liquids stored in tanks where the type of liquid stored varies from time to time.

I have invented a gauge float which will maintain at least a portion of itself in a constant position relative to the surface of a stored liquid (by which term I mean to include a contained liquid) regardless of the specific gravity of the liquid and regardless of changes in specific gravity of the liquid.

Figure 1:
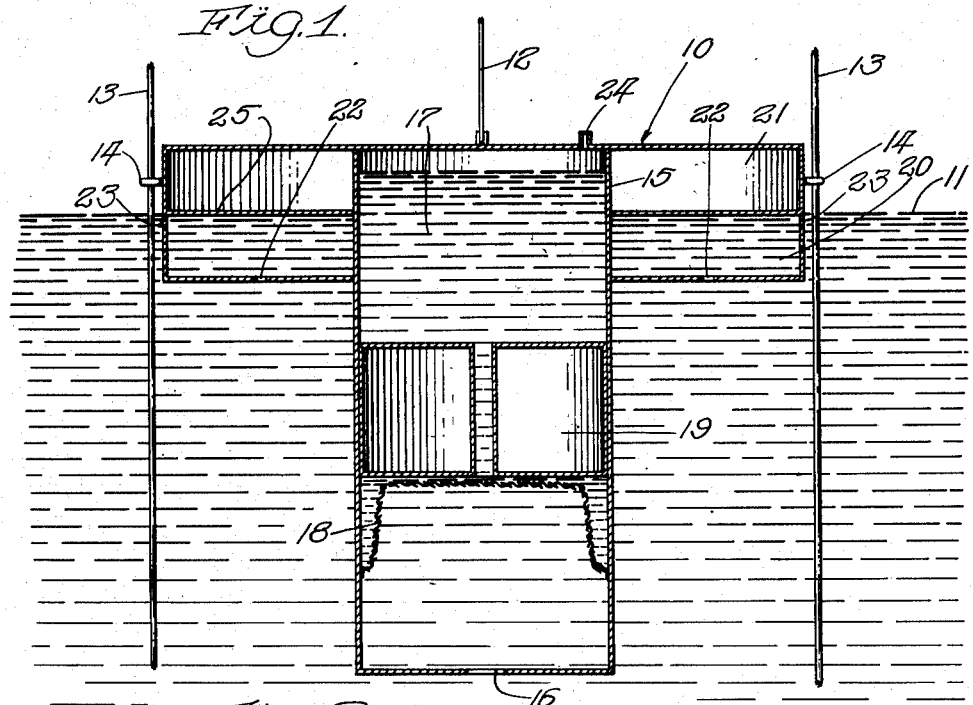
Figure 2:
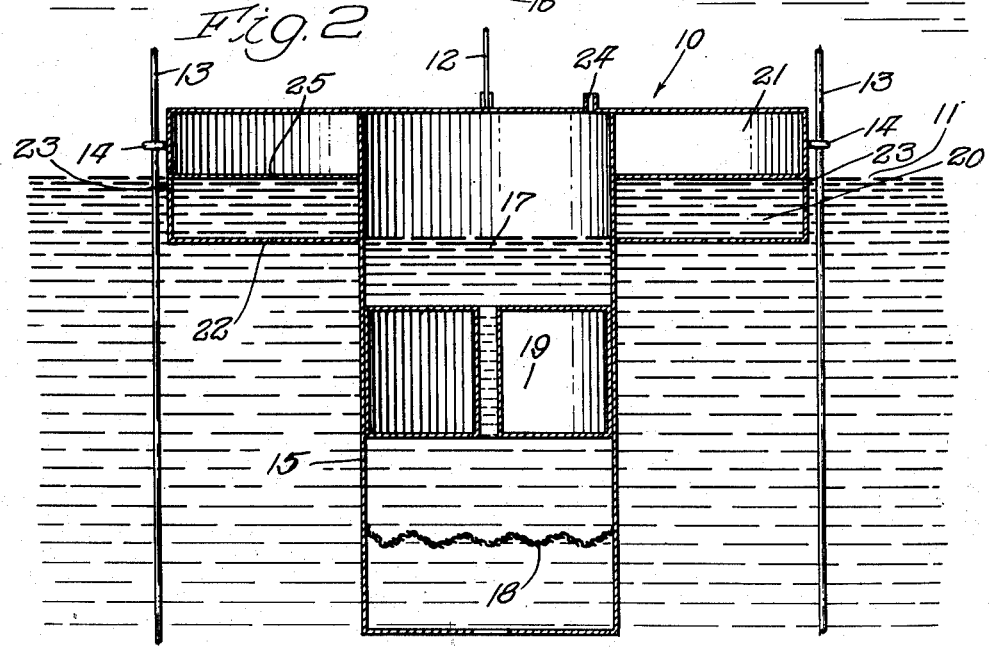

The invention will be described in the embodiments shown in the accompanying drawings in which Figs. 1 and 2 are vertical sections through a preferred form of the float showing its operation in liquids of differing specific gravity. Figs. 3 and 4 are taken like Figs. 1 and 2 showing a modified form of the device.

Referring now to Fig. 1 of the drawings, 10 indicates a gauge float floating in a liquid 11 within a container. A gauge tape 12 is attached to the float and leads to an indicating device of usual construction. Guide cables 13 are attached to the top and bottom of the container and engage rings 14 positioned on the side of the float to restrict motion of the float to vertical movement only. The float 10 comprises a central cylindrical container 15 having an opening 16 at the bottom communicating with the stored or contained liquid 11. The container 15 is filled with a liquid 17 preferably of lightweight such as alcohol. Intermixture of the float liquid 17 and contained or stored liquid 11 is prevented by a flexible diaphragm 18 attached to the lower portion of the cylinder 15 and separating the two liquids. An annular float 19 is secured to the side walls of the cylinder 15 and immersed within the liquid 17. Two annular stabilizing pontoons 20 and 21 are attached to the upper portion of the cylinder 15, the lower pontoon 20 having a plurality of openings 22 on its bottom surface and a second plurality of openings 23 on its upper edge to permit stored liquid 11 slowly to flow in and out of the pontoon. The upper pontoon 21 is airtight. A vent 24 is provided at the upper portion of the cylinder to permit vapor or air to be drawn into and expelled from the cylinder 15 with operation of the float.

The gauge float may be said to consist of two parts, namely the solid part including the float 10 and the diaphragm 18, and the liquid part which is the float liquid 17. The weight of the solid part is borne by the annular float 19 which is immersed in the liquid 17. In turn the combined weight of both the solid part and the liquid part is borne by the stored liquid 11. If the specific gravity of liquid 11 changes, the upper and lower surfaces of liquid 17 will be higher as in Figure 1, or lower as in Figure 2, but in both cases the float 19 is entirely immersed in liquid 17, and the buoyant effect of float 19 is constant. When liquid 11 is lighter and the liquid 17 takes a lower position, a greater quantity of liquid 11 is displaced, and as a result the buoyant force of liquid 11 displaced is also constant. Therefore the float 10 remains at the same elevation even if the specific gravity of the stored liquid 11 changes.

The stabilizing pontoons 20 and 21 act to overcome the inherent instability of a submerged float and also serve to resist sudden forces upon the float. A sudden upward pull on the gauge tape 12 would be resisted by the weight of the stored liquid which has filled the pontoon 20 through the openings 22 and 23, while a sudden force tending to immerse the float will be resisted by the buoyant force of the pontoon 21. As can be seen from the drawing the float is so designed that the liquid level will be substantially even with the bottom 25 of the pontoon 21. Changes in the specific gravity of the contained liquid serve only to raise or lower a level of the liquid 17 within the cylinder and the gauge float remains at the same level relative to the stored liquids.

In the embodiment shown in Figs. 3 and 4, 30 indicates a gauge float connected to a gauge tape 31 in the usual manner and guided within the container by cable means 32. The gauge float 30 floats upon the surface of the contained liquid 33 and is partially filled with a liquid 34. A flexible connection 35 connects the bottom of the gauge float with a pilot float 36 which contains an additional supply of liquid 37 identical to the liquid 34. The two floats are interconnected with a flexible air hose 38 to permit venting back and forth from one float to another. Cable means 39 guides the pilot float 36. The pilot float is provided with a downwardly convex top 41 to provide a restricted space 40 within which the liquid 37 may rise and fall.

This particular embodiment operates on the principle that the buoyant force of the stored liquid 33 upon the gauge float 30 is sufficient to hold that float a certain distance above the surface of the contained liquid, that is, the buoyant force is sufficient to overcome the weight of the container plus the weight of the liquid 34. Variations in the specific gravity of the stored liquid 33 are then compensated for by adding to or subtracting from the amount of liquid 34 within the gauge float so that the gauge float remains at the same position relative to the surface of the contained liquid.

As an example of the operation, let it be assumed that the stored liquid 33 has a specific gravity of 1 as does the liquid 34 and 37. In such a situation the liquid level within the floats would correspond substantially with the level of the liquid in the container. The bottom 42 of the gauge float will be a certain specific distance below the level of the stored liquid, for example, six inches; while the bottom 43 of the pilot float 36 is a greater distance below that surface, for example, nine inches. If the specific gravity of the stored liquid 33 were to be changed to 0.667, for example, the gauge float would sink an additional three inches and the pilot float would sink an additional four and one-half inches. This would drop the level of the liquid 37 below the level of the liquid 34 and a portion of the liquid 34 would be drained into the pilot float by means of the connection 35. As liquid drains from the gauge float into the pilot float the gauge float tends to rise higher within the stored liquid and the pilot float tends to sink lower. This process continues until a point of equilibrium is reached as illustrated in Fig. 4. The levels of the float liquids 34 and 37 are equal and below the level of the stored liquid 33. It can be seen, however, that the bottom 42 of the gauge float is again six inches below the level of the contained liquid, in other words, the gauge float has maintained a constant position with respect to the surface of the liquid 33.

The particular curve of the top 41 on the pilot float is determined by the specific gravity of the liquid within the floats. For example, should the product's specific gravity lower, the pilot float will sink a certain distance, an inch or so. To operate correctly, the float liquid level in the main float must be lowered a distance to compensate for the change in specific gravity. The distance that pilot float sinks is greater than the required lowering of the float liquid level in the main float. This leaves a certain volume in the pilot float to be filled by the liquid which should be removed from the main float. Since this liquid is not of sufficient volume to raise the liquid in the pilot float to the proper level (which is the level of the liquid in the main float after the change in specific gravity), the top 41 has been provided to occupy a part of the space within the pilot so that the liquid will rise to the proper level. The shape of the top must be such as to limit withdrawal of liquid from gauge float 30 into pilot float 36 to the amount needed to compensate for decrease in specific gravity of stored liquid 33. The pilot float must take in the liquid that should be removed from the gauge float, when the specific gravity of the stored product lowers, and also must make up for a difference in the liquid level in the two floats relative to a fixed datum such as the level of stored liquid. Venting from one float to another with changes in liquid level therein is accomplished by means of the connection 38.

While all of the embodiments described are somewhat differently constructed it can be seen that the basic principle employed by all is that of correlating the weight of the float with the buoyant force exerted upon the float so that a portion at least of the float maintains a constant position relative to the surface of the stored liquid.

While I have shown and described certain embodiments of my invention it is to be understood that it is capable of many modifications. Changes, therefore, in the construction and arrangement may be made without departing from the spirit and scope of the invention as disclosed in the appended claims.

Having described my invention, I claim:

1. A gauge float having at least a portion adapted to float at a constant position relative to the surface of a stored liquid regardless of the specific gravity of the liquid comprising a container adapted to be partially immersed in the liquid, stabilizing means positioned about the container, a float liquid within the container, a buoyant portion within the container immersed in the float liquid, said buoyant portion being of such a size that the weight of float liquid it displaces is equal to the total apparent weight of the gauge float exclusive of the float liquid, when the gauge float is floating in a stabilized position in the stored liquid, and the lower portion of the container being open to the stored liquid, said stored liquid and float liquid being separated.

2. The gauge float of claim 1 including a flexible diaphragm between the connecting means and the float liquid.

3. The gauge float of claim 1 in which said stabilizing means includes an annular air tight pontoon.

4. The gauge float of claim 1 in which the stabilizing means includes an annular air tight pontoon and a second annular pontoon beneath the first pontoon, said second pontoon having an opening to the stored liquid.

5. The gauge float of claim 1 in which said stabilizing means includes a first annular pontoon about the container having a bottom forming the top of a second annular pontoon, said second pontoon having a plurality of openings to the stored liquid and said gauge float being adapted to float in the contained liquid with the liquid level at the bottom of the first annular pontoon.

6. The float gauge of claim 1 in which said buoyant portion comprises an annular float attached to the inner side walls of the container.

7. A gauge float having at least a portion adapted to float at a constant position relative to the surface of a stored liquid regardless of the specific gravity of the liquid comprising a substantially cylindrical container adapted to have at least a portion immersed in the liquid, a float liquid within the container, an annular float within the container and attached to the inner side walls thereof adapted to be immersed in the float liquid said annular float being of such a size to displace an amount of float liquid equal in weight to the weight of the gauge float when floating in a stabilized position in the stored liquid, an opening in the lower portion of the container to the stored liquid, a flexible diaphragm between the opening and the float liquid and stabilizing means positioned about the upper portion of the container.

8. A gauge float including a member on said float to be supported at a constant elevation relative to the surface of a stored liquid, a float body at least partially immersed in the stored liquid and having a chamber therein with at least two portions, a float liquid within said chamber, said float liquid comprising a first buoyant portion and an enclosed quantity of gas providing a second buoyant portion, and gravity flow passage means connecting the chamber portions for movement of at least part of the float liquid through the passage means to raise or lower the level of the float liquid in the float body in response to a change in specific gravity of the stored liquid, the volume of displaced stored liquid varying universely as the specific gravity of stored liquid, the buoyant forces being equal to the apparent weight of the float when the gauge float is floating in a stabilized position.

9. A gauge float as specified in claim 8 in which a pilot float is provided to float deeper in the stored liquid than a main float supporting said member, said pilot float and main float providing said chamber portions with said passage means connecting the chamber portions in said float bodies, said main float and pilot float being constructed and arranged to permit float liquid within the main float body to flow to the pilot float with reduction in the specific gravity of the stored liquid whereby to cause the main float to maintain a constant position relative to the surface of the stored liquid.

10. The float of claim 9 including vent means connecting the main and pilot floats together, said vent means being attached to said floats above the level of the float liquid therein.

11. A gauge float as specified in claim 8 in which a main float is weighted with the float liquid and a pilot float is provided to receive and discharge float liquid from and into the float body with change in the specific gravity of the stored liquid.

12. The gauge float of claim 11 in which the pilot float is adapted to maintain a lower position in the stored liquid than the weighted float during all operations of the gauge float.

References Cited in the file of this patent

UNITED STATES PATENTS

| Number | Name | Date |
| --- | --- | --- |
| 863,623 | Mower et al. | Aug. 20, 1907 |
| 1,459,486 | Whitney et al. | June 19, 1923 |
| 1,664,840 | Wermine | Apr. 3, 1928 |
| 1,858,346 | Straughan | May 17, 1932 |
| 2,054,212 | Bacon | Sept. 15, 1936 |
| 2,069,279 | Samiran | Feb. 2, 1937 |
| 2,110,490 | Renner | Mar. 8, 1938 |
| 2,115,043 | Samiran | Apr. 26, 1938 |
| 2,201,974 | Anderson | May 28, 1940 |
| 2,432,875 | Flint | Dec. 16, 1947 |
| 2,552,552 | Head | May 15, 1951 |

FOREIGN PATENTS

| Number | Country | Date |
| --- | --- | --- |
| 386,218 | Great Britain | Jan. 12, 1933 |
| 480,367 | Great Britain | Feb. 22, 1938 |